US007413919B2

(12) United States Patent
Qing et al.

(10) Patent No.: US 7,413,919 B2
(45) Date of Patent: Aug. 19, 2008

(54) METHOD OF MANUFACTURING A STRUCTURAL HEALTH MONITORING LAYER

(75) Inventors: Xinlin Qing, Cupertino, CA (US); Fu-Kuo Chang, Stanford, CA (US)

(73) Assignee: Acellent Technologies, Inc., Sunnyvale, CA (US)

(*) Notice: Subject to any disclaimer, the term of this patent is extended or adjusted under 35 U.S.C. 154(b) by 125 days.

(21) Appl. No.: 11/273,932

(22) Filed: Nov. 14, 2005

(65) Prior Publication Data
US 2006/0154398 A1     Jul. 13, 2006

Related U.S. Application Data

(63) Continuation of application No. 11/062,061, filed on Feb. 18, 2005, now abandoned, which is a continuation of application No. 10/873,548, filed on Jun. 21, 2004, now abandoned.

(60) Provisional application No. 60/480,157, filed on Jun. 20, 2003.

(51) Int. Cl.
*H01L 21/00* (2006.01)
(52) U.S. Cl. .................. 438/48; 438/106; 438/118; 257/E31.001
(58) Field of Classification Search ............ 438/48, 438/106, 118
See application file for complete search history.

(56) References Cited

U.S. PATENT DOCUMENTS

| | | | |
|---|---|---|---|
| 3,713,127 A | 1/1973 | Keledy et al. |
| 3,822,586 A | 7/1974 | Pollock |
| 3,858,439 A | 1/1975 | Nakamura |
| 3,924,456 A | 12/1975 | Vahaviolos |
| 3,956,731 A | 5/1976 | Lewis, Jr. |
| 4,006,625 A | 2/1977 | Davis |
| 4,107,981 A | 8/1978 | Kanagawa et al. |
| 5,176,032 A | 1/1993 | Holroyd et al. |
| 5,195,046 A | 3/1993 | Gerardi et al. |

(Continued)

FOREIGN PATENT DOCUMENTS

DE          4237404          5/1994

(Continued)

OTHER PUBLICATIONS

Roh, Youn-Seo, et al., "*Effect of Impact Damage on Lamb Wave Propagation in Laminated Composites*" Department of Aeronautics and Astronautics, Stanford University, Stanford, CA 94305 (1995) pp. 1-12.

(Continued)

*Primary Examiner*—Walter Lindsay, Jr.
*Assistant Examiner*—Abdulfattah Mustapha
(74) *Attorney, Agent, or Firm*—MacPherson Kwok Chen & Heid LLP

(57) ABSTRACT

Methods of manufacturing a diagnostic layer containing an array of sensing elements. The sensing elements, associated wires, and any accompanying circuit elements, are incorporated various layers of a thin, flexible substrate. This substrate can then be affixed to a structure so that the array of sensing elements can analyze the structure in accordance with structural health monitoring techniques. The substrate can also be designed to be incorporated into the body of the structure itself, such as in the case of composite structures.

32 Claims, 11 Drawing Sheets

U.S. PATENT DOCUMENTS

| | | | |
|---|---|---|---|
| 5,298,964 | A | 3/1994 | Nelson et al. |
| 5,714,687 | A | 2/1998 | Dunegan |
| 5,774,376 | A | 6/1998 | Manning |
| 5,814,729 | A | 9/1998 | Wu et al. |
| 6,006,163 | A | 12/1999 | L'ichtenwalner et al. |
| 6,065,342 | A | 5/2000 | Kerr et al. |
| 6,170,334 | B1 | 1/2001 | Paulson |
| 6,252,334 | B1 | 6/2001 | Nye et al. |
| 6,370,964 | B1 | 4/2002 | Chang et al. |
| 6,399,939 | B1 | 6/2002 | Sundaresan et al. |
| 6,418,384 | B1 | 7/2002 | Rothea et al. |
| 6,529,127 | B2 | 3/2003 | Townsend et al. |
| 6,691,007 | B2 | 2/2004 | Haugse et al. |
| 6,693,548 | B2 | 2/2004 | Boyce et al. |
| 6,768,312 | B2 | 7/2004 | Sun et al. |
| 6,826,982 | B2 | 12/2004 | O'Brien et al. |
| 6,964,201 | B2 | 11/2005 | Xu et al. |
| 7,038,470 | B1 | 5/2006 | Johnson |
| 7,075,424 | B1 | 7/2006 | Sundaresan |
| 7,103,507 | B2 | 9/2006 | Gorinevsky |
| 7,117,742 | B2 | 10/2006 | Kim |
| 7,118,990 | B1 | 10/2006 | Xu et al. |
| 7,201,035 | B2 * | 4/2007 | Sunshine .................. 73/24.01 |
| 7,246,521 | B2 | 7/2007 | Kim |
| 2001/0047691 | A1 | 12/2001 | Dzenis |
| 2002/0154029 | A1* | 10/2002 | Watters et al. ......... 340/870.07 |
| 2003/0164700 | A1* | 9/2003 | Goldfine et al. ............. 324/235 |
| 2004/0002815 | A1 | 1/2004 | Ishizak et al. |
| 2004/0032013 | A1* | 2/2004 | Cobbley et al. ............. 257/678 |
| 2004/0163478 | A1 | 8/2004 | Xu et al. |
| 2005/0072249 | A1 | 4/2005 | Maeda et al. |
| 2006/0079747 | A1 | 4/2006 | Beard et al. |
| 2006/0149449 | A1 | 7/2006 | Baur et al. |
| 2006/0154398 | A1 | 7/2006 | Qing et al. |
| 2006/0179949 | A1 | 8/2006 | Kim |
| 2006/0283266 | A1 | 12/2006 | Qing et al. |
| 2007/0018083 | A1 | 1/2007 | Kumar et al. |

FOREIGN PATENT DOCUMENTS

| | | |
|---|---|---|
| DE | 19835561 | 2/2000 |
| DE | 10217031 | 10/2003 |

OTHER PUBLICATIONS

Keilers, Charles Henry Jr., "*Damage identification in Composites Using Built-in Piezoelectrics: A Dissertation Submitted to the Department of Aeronautics and Astronautics and the Committee on Graduate Studies of Stanford University in Partial Fulfillment of the Requirements for the Degree of Doctor of Philosophy*", pp. 1-111 (Jun. 1993).

Roh, Youn-Seo, "*Built-in Diagnostics for Identifying an Anomaly in Plates Using Wave Scattering*", UMI Microform 9924496, UMI Company, ANn Arbor, MI (1999) pp. iv-88.

Chang, Fu-Kuo, "*Built-in Damage Diagnostics for Composite Structures*" Department of Aeronautics and Astronautics, Stanford University, Stanford, CA 94305 (1995).

* cited by examiner

METHOD OF MANUFACTURING A STRUCTURAL HEALTH MONITORING LAYER

RELATED APPLICATIONS

This is a continuation application of U.S. patent application Ser. No. 11/062,061, filed on Feb. 18, 2005 now abandoned, which is a continuation of U.S. patent application Ser. No. 10/873,548, filed on Jun. 21, 2004 now abandoned, which claims the benefit of U.S. Provisional Patent Application No. 60/480,157, filed on Jun. 20, 2003, all of which are incorporated herein by reference in their entirety and for all purposes.

BRIEF DESCRIPTION OF THE INVENTION

The present invention relates generally to structural health monitoring. More specifically, this invention relates to the manufacturing of a sensing layer for use in structural health monitoring.

BACKGROUND OF THE INVENTION

The diagnostics and monitoring of structures, such as that carried out in the structural health monitoring field, are often accomplished by employing arrays of sensing elements. Such sensing elements, i.e., various types of sensors, actuators, and the like, detect and analyze the behavior and response of various structures. Accordingly, structures often must have a variety of sensing elements placed at various locations. Because individual sensing elements must often be placed separately, affixing a large array of such sensing elements can be tedious and time consuming. In addition, as each individual sensing element can require one or, commonly, multiple wires, large arrays of sensing elements can require a large number of individual wires, which may be difficult to handle and keep track of. The securing of such large numbers of wires can often be painstaking and time consuming, as well.

It is therefore desirable to package such sensing elements and their wires together in such a manner that the abovementioned difficulties are avoided, or at least reduced. Similarly, it is also desirable to develop methods of achieving such packaging. In this manner, the need to handle large numbers of sensing elements individually can be reduced, thus increasing the speed and efficiency with which structures can be prepared for structural health monitoring.

SUMMARY OF THE INVENTION

Broadly speaking, the invention pertains to methods of manufacturing a diagnostic layer containing an array of sensing elements. The sensing elements and their associated wires, and sometimes their electronics as well, are incorporated into a thin, flexible substrate. This substrate can then be affixed to a structure so that the array of sensing elements can analyze the structure in accordance with structural health monitoring techniques. The substrate can also be designed to be incorporated into the body of the structure itself, such as in the case of composite structures.

The invention can be implemented in numerous ways, including as a method, system, device, or apparatus. Several embodiments of the invention are discussed below.

As a method of fabricating a sensing layer, one embodiment of the invention comprises providing a flexible substrate, the flexible substrate having a dielectric layer and conductive leads exposed on the dielectric layer, the conductive leads extending to an edge of the dielectric layer. Also provided is a first flexible nonconductive cover layer having holes therethrough. The first cover layer is affixed to the flexible substrate so as to overlay the conductive leads. This first cover layer is overlain in such a manner as to align the holes with the conductive leads, thereby exposing at least a portion of the conductive leads through the first cover layer. Sensing elements are then placed through the holes in the first cover layer and onto the conductive leads, and an adhesive is deposited within the holes so as to surround the sensing elements with the adhesive.

As a method of manufacturing an embedded sensor layer, another embodiment of the invention comprises providing a flexible substrate having conductive traces deposited on a dielectric medium, and holes in the dielectric material exposing portions of the conductive traces, the conductive traces extending to an edge of the flexible substrate and exposed on an outer surface of the dielectric medium. Sensing elements are placed in the holes and in electrical communication with the exposed portions of the conductive traces. A nonconductive adhesive is then deposited within the holes so as to at least partially surround the sensing elements, and so as to affix the sensing elements to the flexible substrate. The flexible substrate and the sensing elements are then attached to a structure so as to facilitate the monitoring of the structural health of the structure by the sensing elements.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention, together with further objects and advantages thereof, may best be understood by reference to the following description taken in conjunction with the accompanying drawings, in which.

Like reference numerals refer to corresponding parts throughout the drawings. Also, it is to be understood that the depictions in the figures are diagrammatic and not to scale.

DETAILED DESCRIPTION OF THE PREFERRED EMBODIMENTS

The present invention relates generally to the fabrication of a layer with an embedded array of sensing elements for monitoring the health of a structure. A thin flexible substrate with conductive traces is provided. In one embodiment, at least one cover layer is attached to the substrate, with holes exposing portions of the conductive traces. Sensing elements are placed in the holes and attached to the conductive traces. In this manner, a network of sensing elements is embedded within a flexible layer that can be attached to a structure as a single, easy-to-handle unit. As the conductive traces are contained within the layer, fewer loose wires exist, and handling is made easier.

Figure 1A:
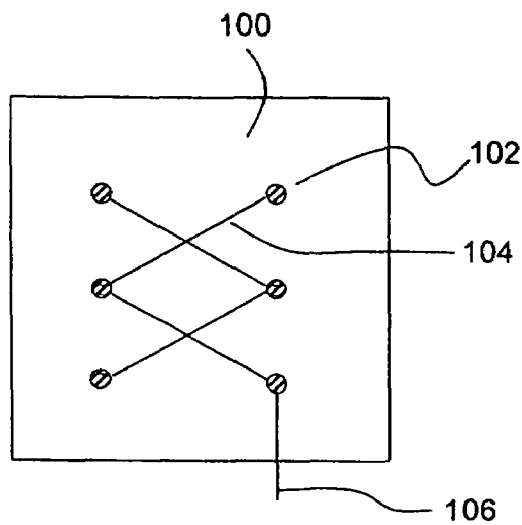
FIG. 1A illustrates a top view of a sensing layer manufactured in accordance with embodiments of the present invention.

FIG. 1A illustrates one such sensing layer manufactured in accordance with embodiments of the present invention. A diagnostic layer 100 is shown, which contains an array of sensing elements 102. The sensing elements 102 can be sensors/actuators capable of both transmitting and receiving signals used in structural health monitoring such as stress waves, and are connected to conductive traces 104. The traces 104 connect (or interconnect, if necessary) sensing elements 102 to one or more output leads 106 configured for connection to a processor or other device capable of analyzing the data derived from the sensing elements 102 and/or actuating the sensing elements 102.

Figure 1B:
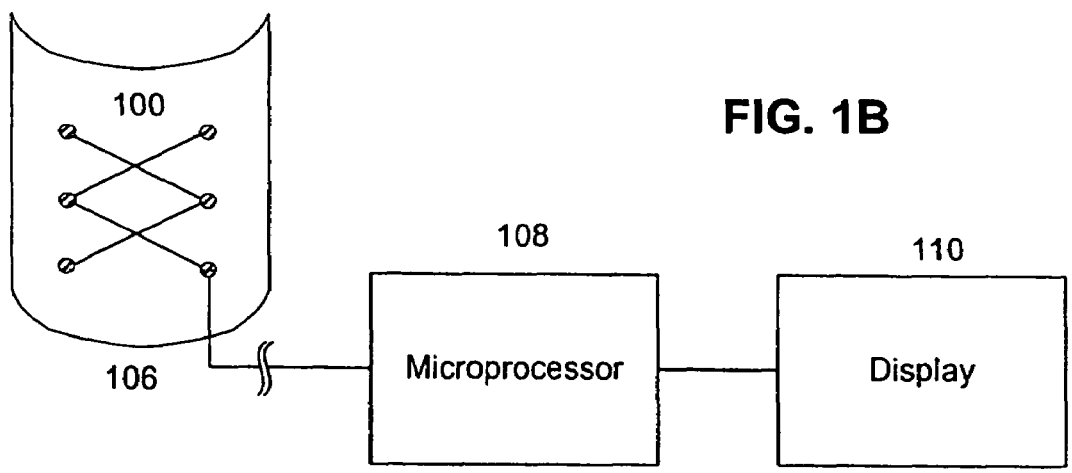
FIGS. 1B-1C illustrate block and circuit diagrams, respectively, describing elements of a sensing layer and their operation.

The diagnostic layer 100 and its operation are further described in U.S. Pat. No. 6,370,964 to Chang et al., which is hereby incorporated by reference in its entirety and for all purposes. For illustration, FIG. 1B further describes aspects of the operation of the diagnostic layer 100. In operation, the output leads 106 are electrically connected to an analysis unit such as a microprocessor 108, suitable for analyzing signals from the sensing elements 102. In certain embodiments, the flexible layer 100 is first attached to a structure in a manner that allows the sensing elements 102 to detect (or, if necessary, project) quantities related to the health of the structure. For instance, the sensing elements 102 can be sensors configured to detect stress waves propagated within the structure, and emit electrical signals accordingly. The microprocessor 108 then analyzes these electrical signals according to known structural health monitoring methods, to assess various aspects of the health of the structure. For instance, detected stress waves can be analyzed to detect crack propagation within the structure, delamination within composite structures, or the likelihood of fatigue-related failure. Quantities such as these can then be displayed to the user via display 110.

Figure 1C:
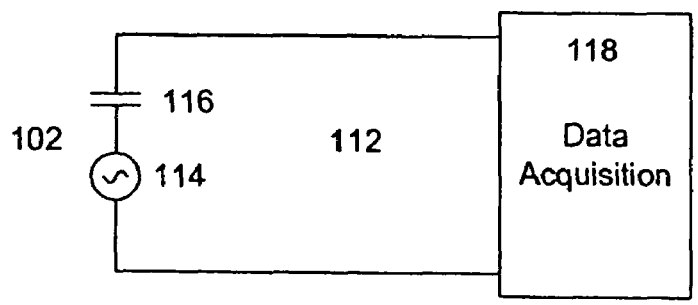

In one embodiment, the sensing elements 102 are piezoelectric transducers capable of reacting to a propagating stress wave by generating a voltage signal. Analysis of these signals highlights properties of the stress wave, such as its magnitude, propagation speed, frequency components, and the like. Such properties are known to be useful in structural health monitoring. FIG. 1C illustrates a circuit diagram representation of such an embodiment. This embodiment can often be represented as a circuit 112, where each sensing/element 102 is represented as a voltage source 114 in series with a capacitor 116. This pair is in electrical contact with a data acquisition unit 118, such as a known data acquisition card employed by microprocessors 108 (the data acquisition unit 118 can be thought of as a component of the microprocessor 108). Propagating stress waves induce the sensor 102 to emit a voltage signal that is detected by the data acquisition unit 118, where it can be analyzed to determine the health of the structure in question.

Figure 2A:
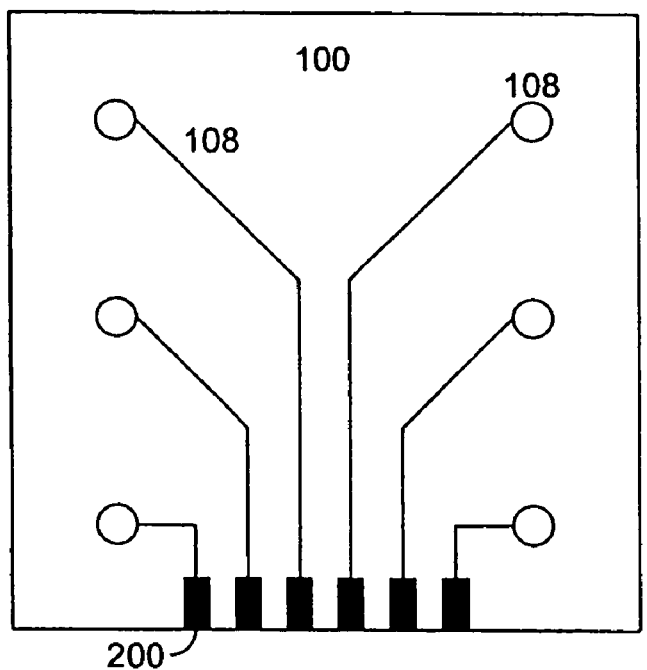
FIG. 2A illustrates a top view highlighting further details of a sensing layer.

FIG. 2A illustrates further details of a sensing layer 100. It should be noted that the invention includes sensing layers 100 configured in any number of ways. For instance, the sensing elements 102 can be distributed in any manner throughout the layer 100. Here, six such elements 102 are shown regularly distributed, each with a single trace 104 extending to the contacts 200. However, one of skill will observe that the sensing elements 102, traces 104, and contacts 200 can be distributed in any mariner, and in any number, without departing from the scope of the invention.

Figure 2B:
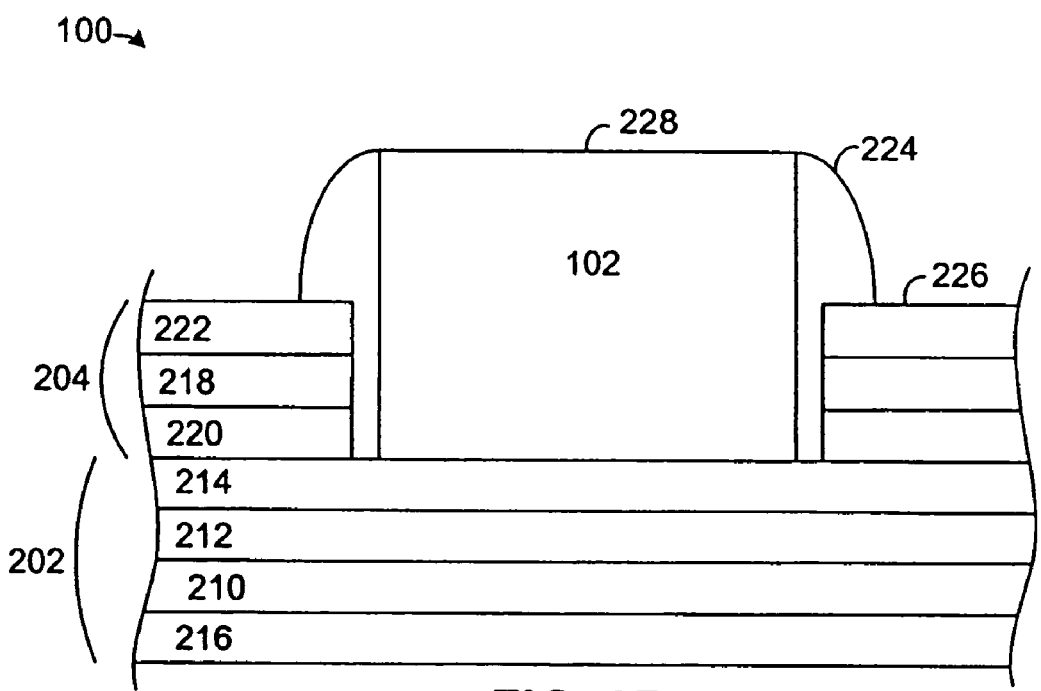
FIG. 2B illustrates a cutaway side view highlighting details of a two-layer sensing layer, and an associated sensing element.

Similarly, the layer 100 can be configured in any manner that couples the sensing elements 102 together. For example, the layer 100 can be of any thickness, and any material that acts to satisfactorily couple the elements 102 while still allowing for structural health monitoring. The layer 100 can be a single unitary sheet of material, or it can be made of a number of layers of different materials. FIG. 2B illustrates one such configuration, which is a "two-layer" configuration in which a flexible cover layer 204 is attached to a flexible substrate 202. The substrate 202 provides a base material on which the sensing elements 102 are to be attached, and also has deposited on it the traces 104, contacts 200, and any other conductive elements required to place the sensing elements 102 in electrical communication with external components such as the microprocessor 108.

More specifically, the substrate 202 is made of a number of discrete layers sandwiched together. A base material 210, which is simply any flexible material suitable for supporting sensing elements 102 (known flexible circuit substrate polymers, for example), supports a circuit layer 214, which is either directly deposited on the base material 210 or applied via an adhesive layer 212. The attachment of conductors, such as traces 104, to flexible substrates such as polymers is known in the art. An additional adhesive layer 216 can be deposited to the opposite side of the base material 210 to facilitate the bonding of the layer 100 to a structure, particularly when the layer 100 is embedded within a structure, as with many composite structures.

The substrate 202 is protected by a protective cover layer 204, which is itself made of a number of discrete layers. The cover layer 204 includes a base material 218, which can be any flexible material suitable for protecting the substrate 202 but which is commonly the same material as that of the base material 210. This base material 218 layer is sandwiched by adhesive layers 220, 222, which are used to stick the cover layer 204 to the substrate 202, and to attach the entire sensing layer 100 to a structure, respectively.

The cover layer 204 overlays the circuit layer 214, thus electrically insulating the circuit layer 214 as well as protecting it from damage. Holes are cut in the cover layer 204 and aligned with the traces 104 of the circuit layer 214. When a sensing element 102 is inserted and its lower surface 227 is affixed via a conductive adhesive (or other suitable material such as a solder) 224, the cover layer 204 also acts to partially surround and protect the sensing element 102. Similarly the adhesive 224, which can be any adhesive suitable for application of structural health monitoring sensors to a substrate, also surrounds and protects the sensing element 102.

In configurations in which the overall thickness of the layer 100 is to be kept thin so that the mass of the layer 100 itself is prevented from influencing the dynamic behavior of the structure, the individual component layers 210-216, 218-222 can be fabricated in the range of approximately half a mil to one mil thickness, or less. Known materials can be employed in each of the layers of the substrate 202 and cover layer 204. For example, current flexible circuits are configured with similar such layers of base material and conductive elements, each attached to the other with adhesives. However, one of skill will realize that the invention can employ other materials, and discloses simply flexible layers of dielectric base material and conductive traces, connected by adhesives.

In operation, the exposed surface 226 of the adhesive 222, and the upper surface 228 of the sensing element 102, are attached to the structure to be monitored. Often, an adhesive such as an epoxy is used to securely attach the surfaces 226, 228 to the structure, where the sensor can then detect and monitor the structure's health by sending electrical signals to the microprocessor 108 via the circuit layer 214, or by converting electrical signals from the microprocessor 108 into diagnostic stress waves.

Figure 3:
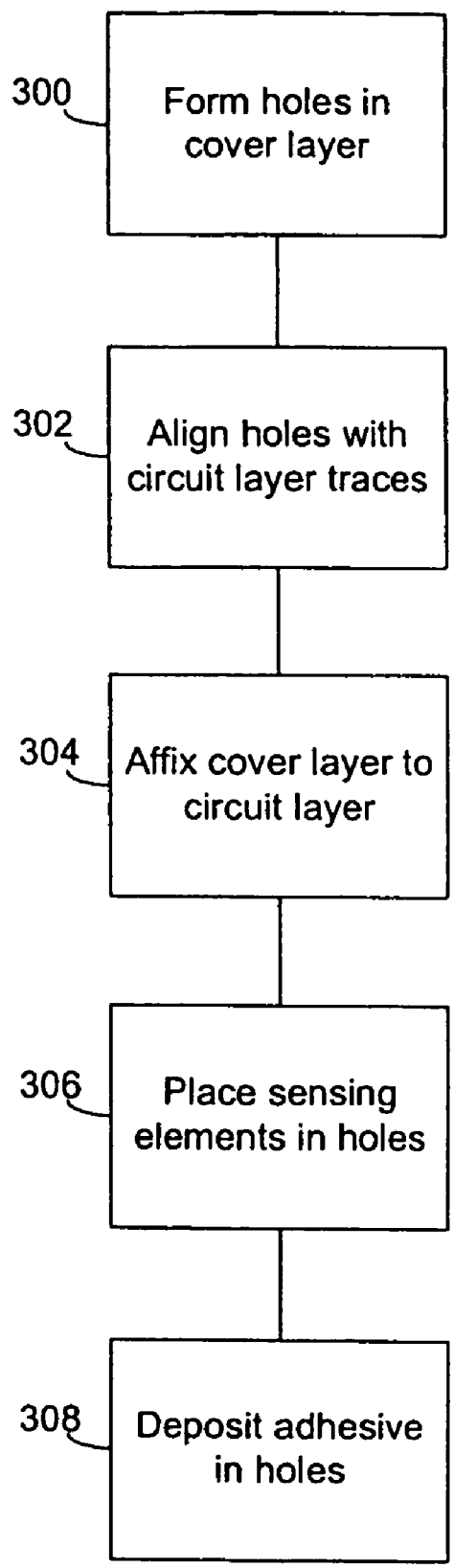
FIG. 3 illustrates process steps taken in fabricating the sensing layer of FIGS. 2A-2B.

FIG. 3 illustrates process steps involved in the manufacture of the two-layer configuration of FIGS. 2A-2B. First, a substrate layer 202 and cover layer 204 are fabricated as shown in FIG. 2B. The fabrication of such layers 202, 204 is similar to the fabrication of known flexible circuits, and need not be further described. Holes are then formed in the cover layer, at locations where a sensing element 102 is desired (step 300). The holes are then aligned with the circuit layer traces 104 so as to expose those portions of the traces 104 that are to be in electrical communication with the sensing elements 102 (step 302). After that, the cover layer 204 is affixed to the substrate layer 202 (step 304), the sensing elements 102 are placed in the holes and in contact with the exposed portions of the traces 104 (step 306), and adhesive is deposited in the holes to secure the sensing elements 102 in place (step 308).

Figure 4A:
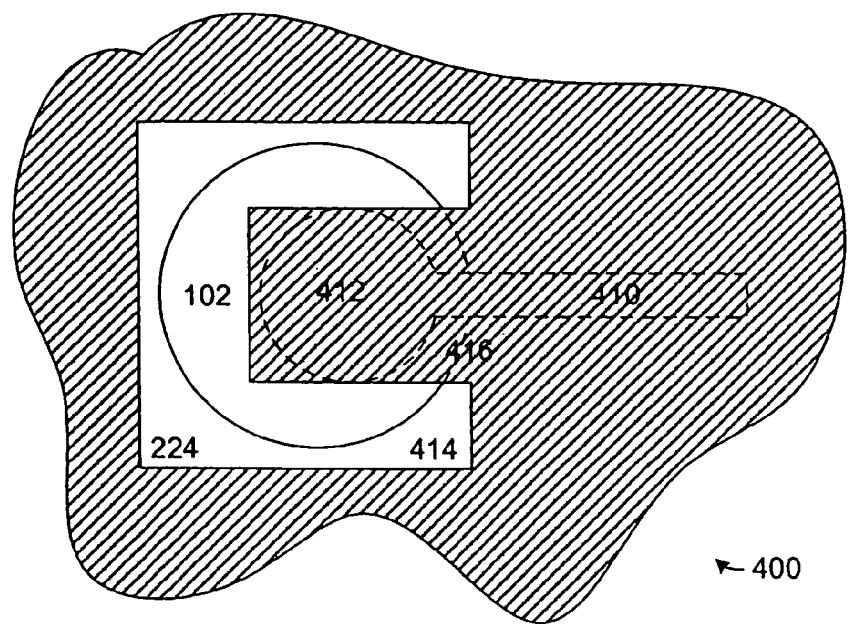
FIGS. 4A-4B illustrate top and cutaway side views, respectively, of details of a three-layer sensing layer, and associated sensing element.
Figure 4B:
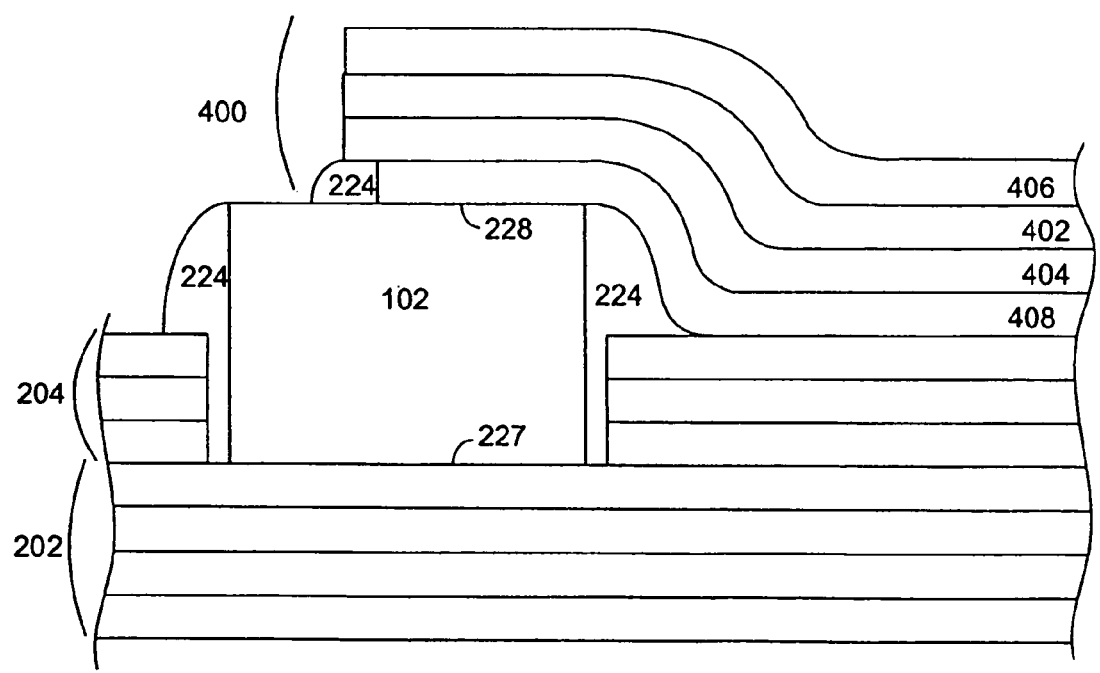

FIGS. 4A-4B illustrate top and cutaway side views of another configuration, a "three-layer" configuration in which an additional layer 400 overlays the substrate layer 202 and cover layer 204. Some sensing elements 102 are configured with signal terminals located at their lower surfaces 227, and ground terminals located at their upper surfaces 228. The three layer configuration thus allows one terminal (often the signal terminal) to be connected to the substrate layer 202, and the other (often the ground) to be connected to the additional layer 400. More specifically, the circuit layer 400 has a base material layer 402 sandwiched between adhesive layers 404, 406, with one adhesive layer 404 also attached to a circuit layer 408. The base material 402 and adhesive layers 404, 406 are configured and constructed in like manner to the cover layer 204. Similarly, the circuit layer 408 is constructed similar to the circuit layer 214, with conductive elements such as traces 410 and electrodes 412 deposited so as to provide flexible conductive wires that electrically ground the sensing elements 102, or provide other electrical functions.

Figure 5:
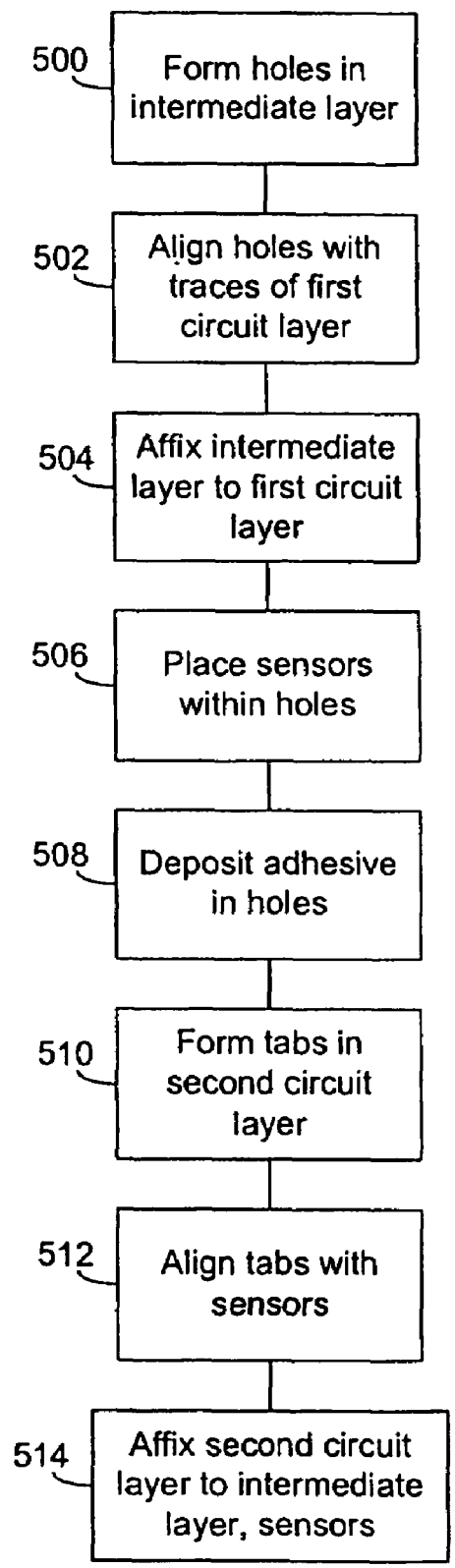
FIG. 5 illustrates process steps taken in fabricating the sensing layer of FIGS. 4A-4B.

FIG. 5 illustrates process steps involved in the manufacture of the three-layer configuration of FIGS. 4A-4B. The manufacture of the three-layer configuration is similar in many respects to that of the two-layer configuration, with steps that are added due to the presence of a third layer. First, a substrate layer 202, cover layer 204, and additional layer 400 are fabricated as described above. Holes are formed in the intermediate cover layer 204, corresponding to the desired locations of the sensors and the locations of the leads 104 to be exposed (step 500). These holes are then aligned with the portions of the leads 104 that are to be exposed (step 502), and the cover layer 204 is affixed to the substrate layer 202 (step 504). Sensing elements 102 are placed within the holes so that their signal terminals electrically contact the appropriate leads 104 (step 506), and adhesive is deposited in the holes around the sensing elements 102 (step 508).

To connect the traces 410 and/or electrodes 412 of the circuit layer 408 to the ground terminal of the sensing element 102, cutouts 414 are made in the layer 400, in the vicinity of the electrodes 412 (step 510). The cutouts 414 each form a flexible tab 416, which is simply a portion of the layer 400 that has had its surrounding material removed. One can observe that the tab 416 is flexible and relatively free to be physically manipulated. This allows the electrode 412 within the circuit layer 408 to be placed on the upper surface 228 of the sensing element 102, where it contacts the ground terminal of the element 102. Accordingly, the tabs 416 are aligned with the ground terminals of the sensing elements 102 (step 512), and the layer 400 is then affixed to the intermediate cover layer 204 (step 514).

The manufacture of diagnostic layers 100 having been described, attention now turns to various alternate configurations of the layers 100. In each case, one of skill will observe that such layers 100 can often be manufactured according to the steps described above, albeit perhaps in different sequences or perhaps requiring repetitions of various steps. The manufacture of each configuration will thus not be discussed separately, except to note those instances in which additional, or as-yet-to-be-described steps may be required.

It should be noted that the circuit layers 214, 408 can include conductive elements of any configuration. For example, each circuit layer 214, 408 need not be limited to cases in which a single trace runs from each sensing element 102. Instead, the invention includes layers 100 which have multiple traces 104 extending to each sensing element 102. In this manner, layers 100 can be designed with redundant traces 104 in case some fail. Likewise, the invention includes designs in which each sensing element 102 has multiple terminals on a single face. Indeed, such sensor configurations are currently known. Layers 100 can thus be designed in which a single circuit layer 214, 408 accomodates sensing elements 102 with a ground terminal and a signal terminal on the same face of the element 102, where one trace extends from the ground terminal to a grounded contact 200, and another trace extends from the signal terminal to a different contact 200.

Figure 6A:
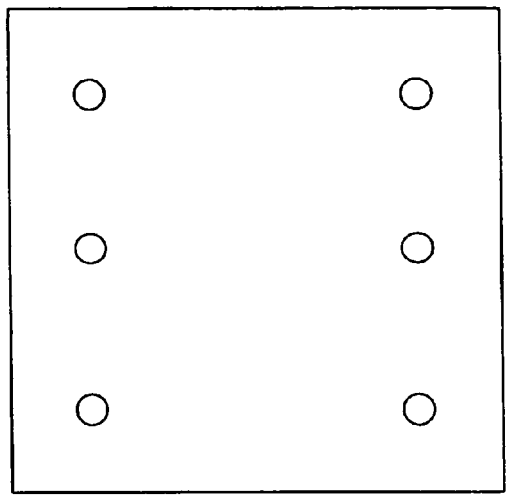
FIGS. 6A-6C illustrate details of a sensing layer having multiple sets of conductive leads.
Figure 6B:
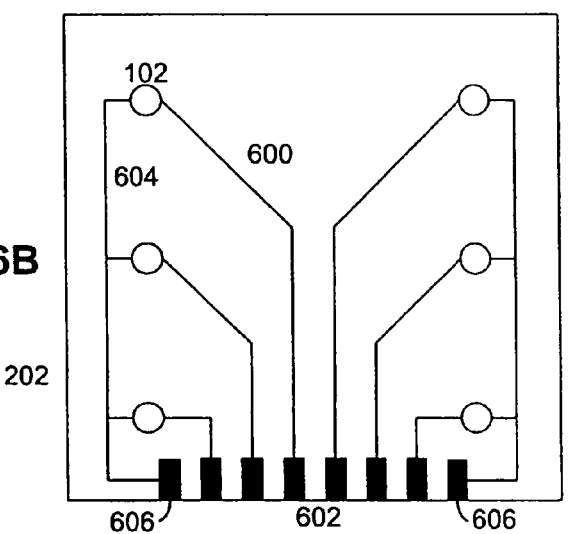
Figure 6C:
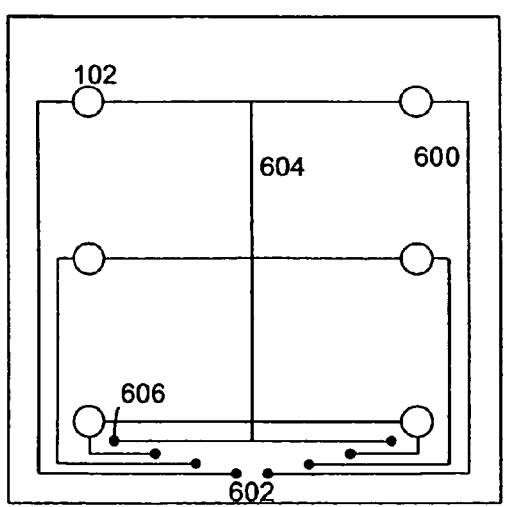

Further to this concept, it is possible for three-layer configurations to include circuit layers 214, 408 that each have multiple traces extending from a single sensing element 102. FIGS. 6A-6C illustrate views of a intermediate cover layer 204, substrate layer 202, and circuit layer 400 respectively, wherein the substrate layer 202 and circuit layer 400 each have multiple traces in electrical contact with each sensing element 102. In this embodiment, each layer 202, 400 is configured with a set of signal traces 600 extending to signal contacts 602, and a set of ground traces 604 extending to ground contacts 606. In this manner, each sensor can be independently operated by a single layer 202, 400.

It should also be noted that the invention need not be limited to configurations in which the multiple wires of each layer 202, 400 are limited to signal and ground wires. Rather, the invention encompasses embodiments in which each layer 202, 400 contains any number of traces extending to each sensing element 102, each trace capable of performing an arbitrary function.

Figure 7:
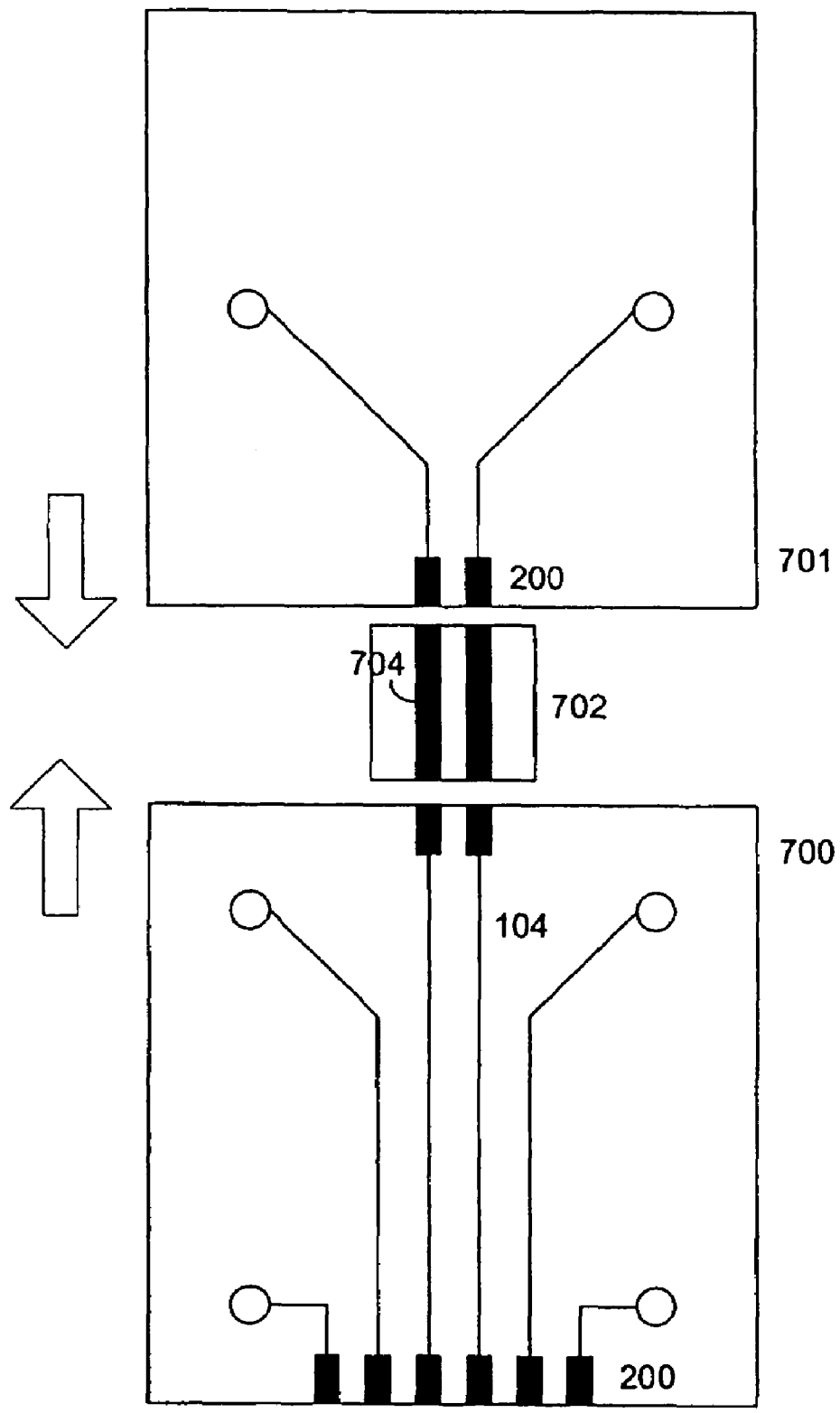
FIG. 7 illustrates details of a sensing layer configured for attachment to other sensing layers.

FIG. 7 illustrates another configuration in which each layer is configured for connection to another layer, allowing individual smaller layers to be effectively connected together so as to construct a single, larger layer. In the example shown, a layer 700 and a separate layer 701 are each configured with contacts 200 in locations that allow them to be electrically connected via a conductive patch 702. The conductive patch 702 can be simply another smaller layer that can be configured as the others, or it can be a dielectric tape with conductive strips 704 deposited thereon. Layers 700, 701 are then connected by moving them together in the direction of the arrows, and applying the conductive patch 702 to engage the appropriate contacts 200. In practice, the layers 700, 701 can be circuit layers 202, 400 designed as above, wherein conductive patches 702 are applied before adjacent layers such as the cover layer 204 are applied. In two-layer configurations, it is also possible to manufacture cover layers 204 with cutouts that correspond to the shape of a patch 702, so that the contacts 200 are exposed. In this manner, layers 100 can be applied to a structure first, and the patch 702 can be later applied to electrically connect the contacts 200. This allows smaller, more easily handled layers 100 to be applied to a structure, rather than larger, more unwieldy ones.

In certain applications, it is desirable to monitor the health of structures with complicated three-dimensional geometries. In these cases, pre-shaped layers 100 capable of holding a three-dimensional shape are beneficial. For example, the application of a layer 100 to an airplane wing or a car side frame may be difficult, involving excessively bending the layer 100. Such problems are at least partially alleviated through use of a pre-formed layer 100 that is already shaped to a geometry that is compatible with that of the structure to be monitored.

Figure 8:
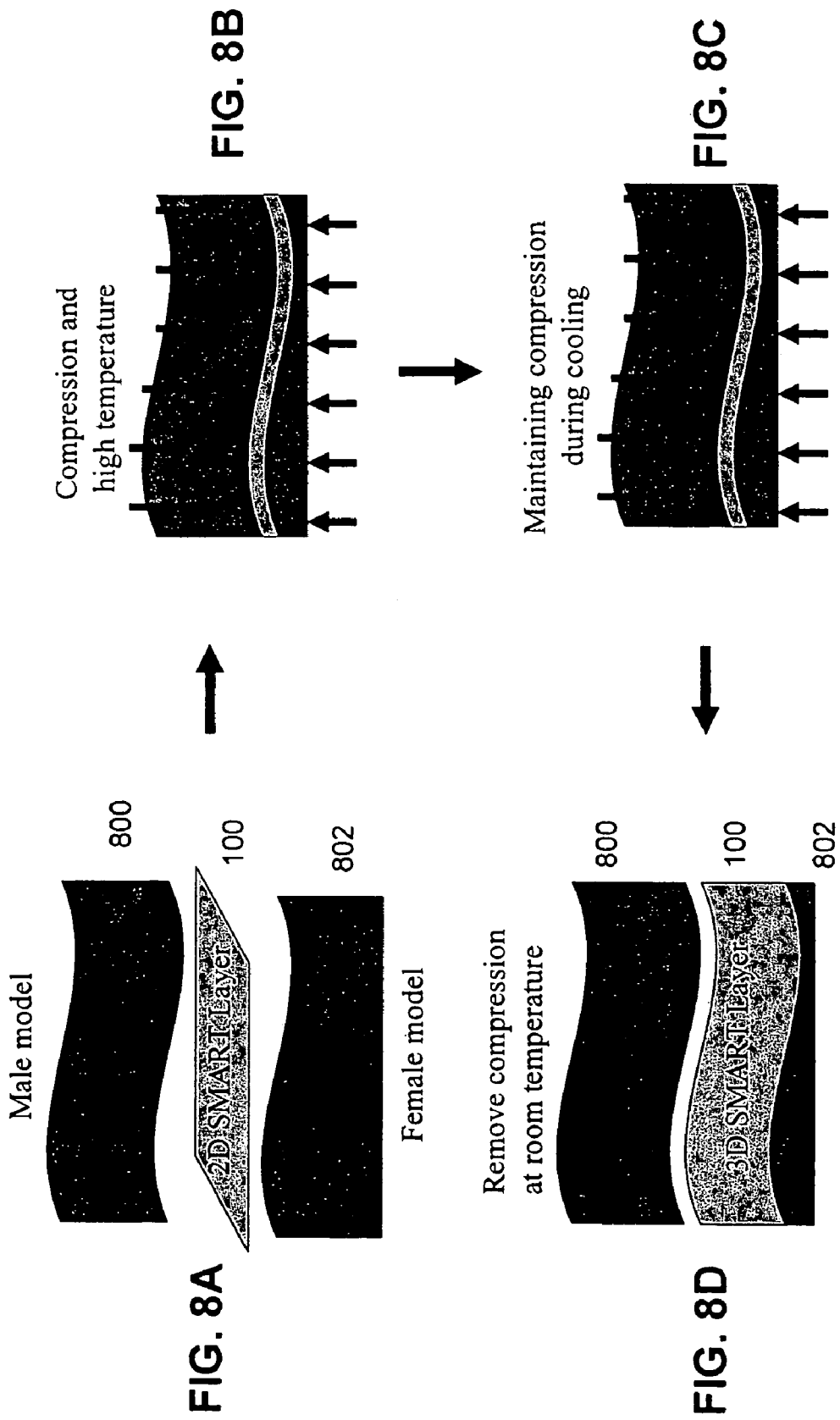
FIGS. 8A-8D illustrate process steps taken in fabricating a three-dimensional sensing layer.

FIGS. 8A-8D illustrate process steps employed in the pre-shaping of a layer 100 before application to a structure. Models 800, 802 are made that represent the geometry of the structure to be monitored. A layer 100 is then placed between them (FIG. 8A), and pressure and heat are applied to "set" the layer 100 into a permanent shape (FIG. 8B). In practice, it has been found that evacuating the space between the models 800, 802 (i.e., approximately 30 psi applied to the layer 100), along with heating the layer 100 to a temperature of at least approximately 250° F., for a period of at least approximately 20 to 30 minutes, is sufficient to set a somewhat permanent shape into layers 100 made from conventional flexible circuit materials. Upon cooling, the pressure can be maintained (FIG. 8C) to further ensure the setting of the shape, wherein upon sufficient cooling the layer 100 can be removed from the molds (FIG. 8D).

The setting of such three dimensional shapes is useful in pre-forming layers 100 to shapes that facilitate the application of the layers 100 to complex structures. While the above temperatures and pressures have been found to be successful in inducing a set shape upon a layer 100, the invention is not limited to the exact temperatures and pressures listed. Instead, any curing process, whether employing the temperatures and pressures shown or otherwise, can be employed.

Figure 9:
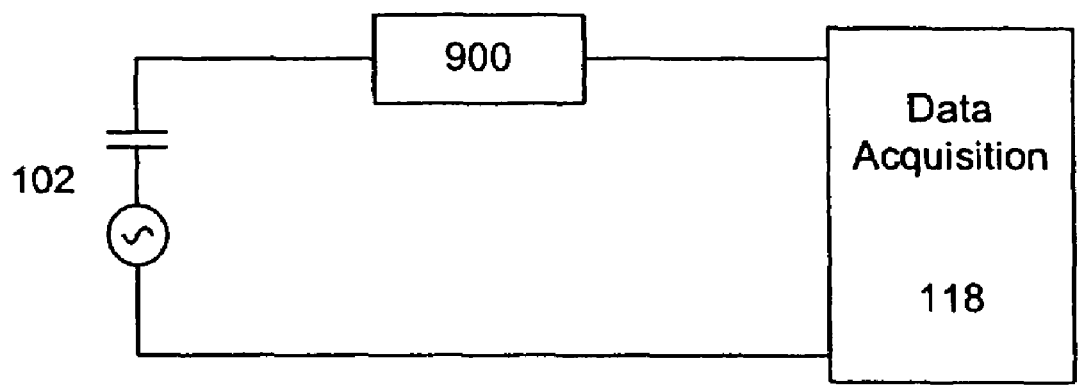
FIG. 9 illustrates a circuit diagram representation of sensing elements coupled to impedance reduction elements.

In still other configurations, it is useful to employ other circuit elements to modify the signals generated by the sensing elements 102. For instance, if sensing elements 102 emit signals of greater magnitude than a data acquisition unit 118 can handle, it is possible to fabricate circuit elements on the circuit layers 202, 400 that reduce this magnitude. FIG. 9 illustrates a circuit diagram representation of such a configuration. It is known in the art that circuit elements can be fabricated on the conductive layers of flexible circuits. Accordingly, various embodiments of the invention include the fabrication of circuit elements on the circuit layers 202, 404, where the circuit elements are configured to aid in the acquisition and processing of data. For example, when it is desired to attenuate the signals from sensing elements 102, circuit elements 900 can be deposited on the circuit layers 202, 404 in electrical series between the sensing elements 102 and data acquisition module 118. Such circuit elements 900 can be any known elements or combination of elements that aids in structural health monitoring. In this case, the circuit elements 900 can be a simple resistor-capacitor pair capable of attenuating frequencies. However, other combinations are possible according to the desired application. For instance, elements 900 comprising known low pass filters or high pass filters can be deposited so as to attenuate excessively large low frequencies, or excessive noise, respectively.

Figure 10A:
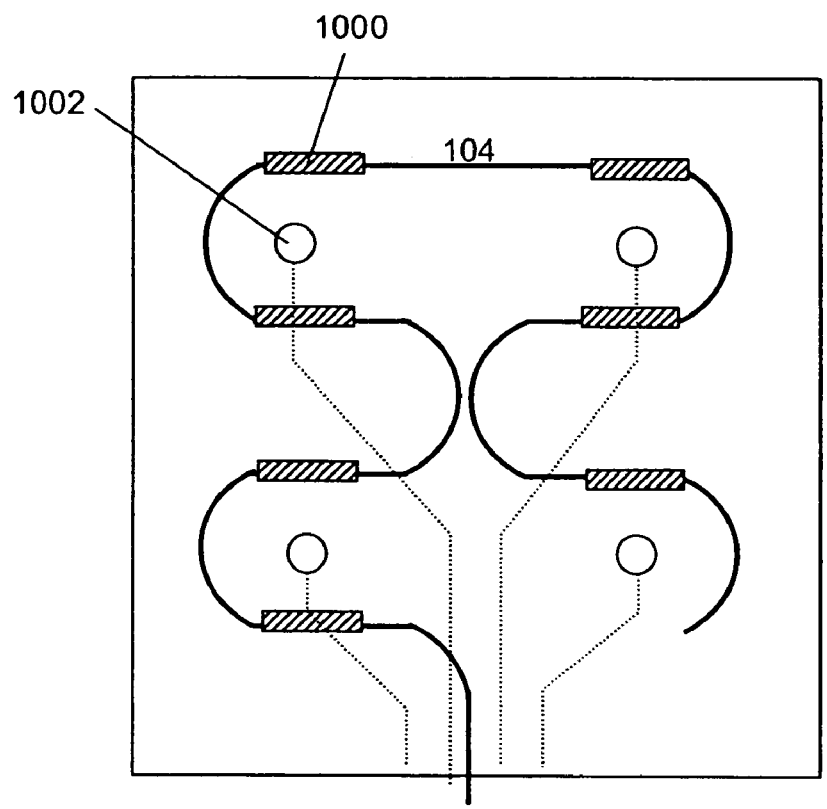
FIGS. 10A-10B illustrate top and cutaway side views, respectively, of a sensing layer configured with additional sensors for measuring additional quantities.
Figure 10B:
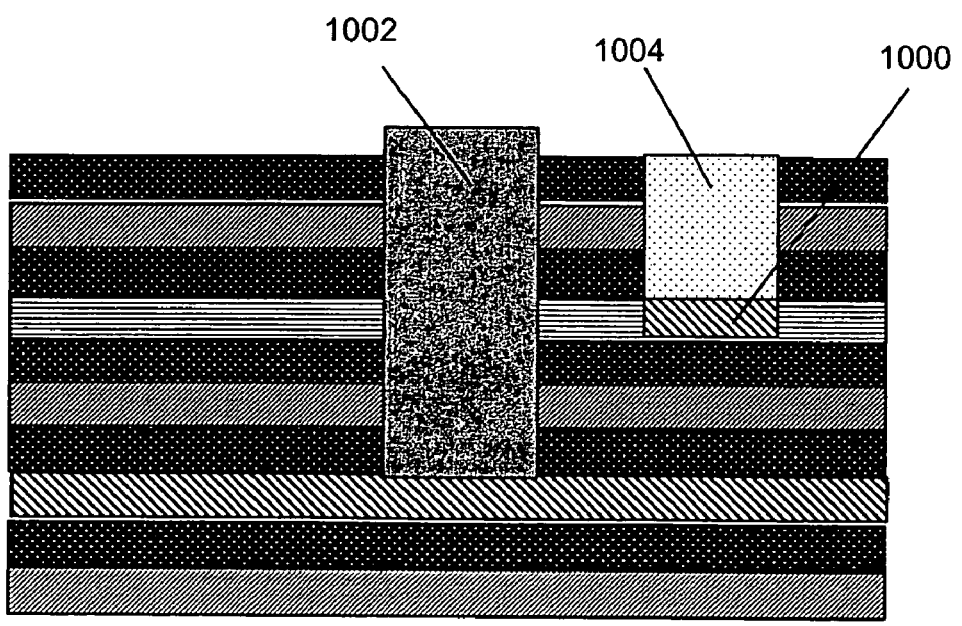
Figure 11:
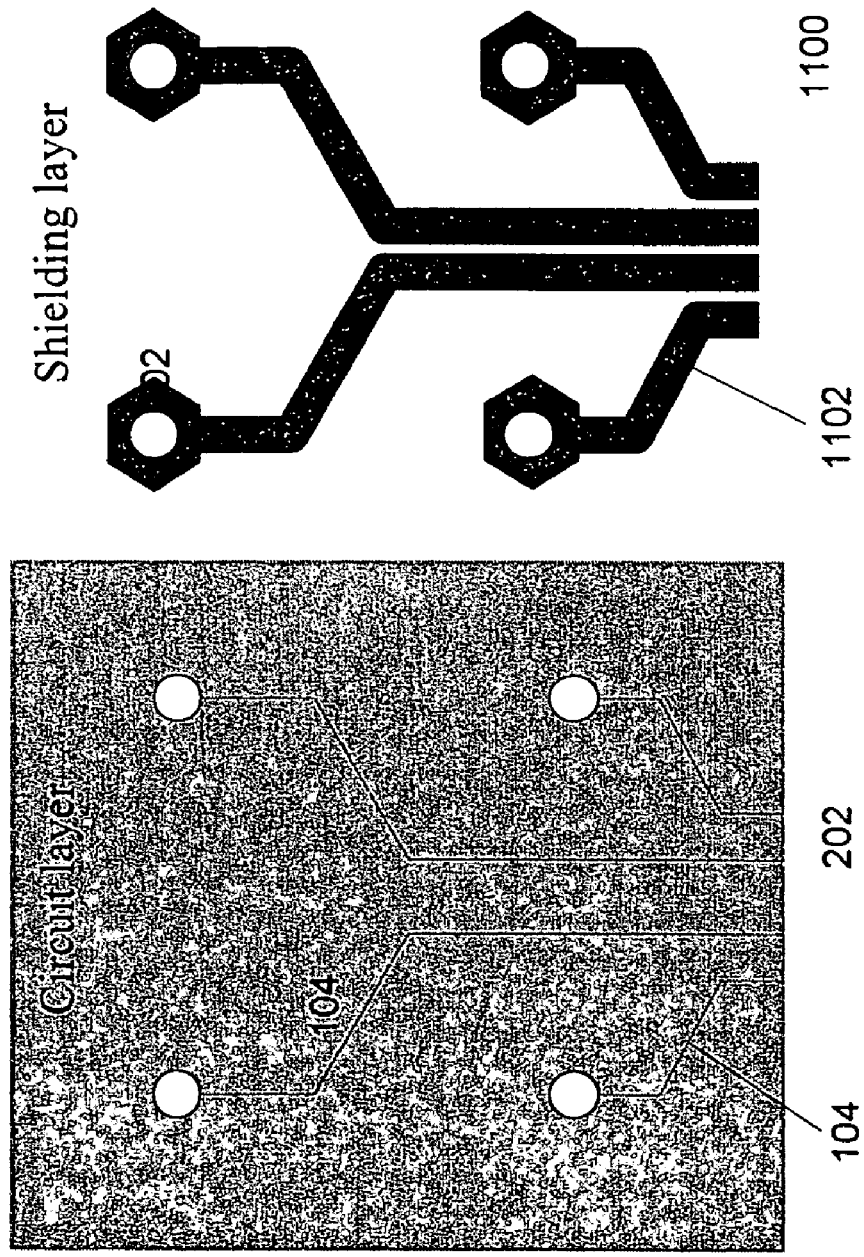
FIG. 11 illustrates details of a sensing layer configured with electromagnetic shielding elements.

In still other configurations, it may be beneficial to employ multiple types of sensors simultaneously within the same layer 100. For instance, piezoelectric transducers may be desirable as actuators used to excite a structure. However, their use as sensors may not be desired in applications that are extremely sensitive to noise. In such situations, fiber optic sensors may be employed instead. It should be noted that these additional sensors, be they fiber optic or otherwise, can be embedded within the layer 100 just as any other sensing element 102. FIGS. 10A-10B illustrate top and cutaway side views, respectively, of a layer 100 having both fiber optic sensors 1000 and piezoelectric actuators 1002 embedded therein. In this example, a three-layer configuration is used, although one of skill will recognize that two-layer configurations will perform adequately as well.

More specifically, piezoelectric actuators 1002 are embedded as any other sensing element 102 according to the processes described above. In somewhat similar fashion, additional open windows 1004 may be formed in the flexible substrates to allow fiber optic sensors 1000 to attach directly to the structure later. The flexible substrate with fiber optic sensor 1000 is thus placed on a circuit layer to form a hybrid diagnostic layer 100. The depositing of fiber optic sensors and their associated leads 104 onto flexible substrates is known. Such sensors 1000 are thus placed on a circuit layer and aligned with the appropriate holes to allow for optical analysis of a structure. The layer 100 is then attached to the structure as before, allowing the piezoelectric transducers 1002 to excite the structure while the fiber optic sensors 1000 monitor the resulting dynamic behavior of the structure.

One frequently encountered problem exists in interference caused by electromagnetic radiation. In applications in which the layer 100 operates in an environment containing such radiation, interference and other problems can be seen. Thus, in a final specifically described configuration, a layer 100 is described in which electromagnetic shielding is employed. More specifically, a shielding layer 1100 can be attached to the adhesive layer 216 of the substrate 202 so as to selectively shield the sensing elements 102 from electromagnetic radiation. The shielding layer 1100 is simply another layer that can be configured like any other, with a layer of metallic shielding traces 1102 overlaying a base material layer that is affixed to the adhesive layer 216. The shielding traces 1102, like any other traces, can be designed in any configuration or shape, but are generally designed so as to shield their underlying traces 104 from radiation. The invention accordingly includes configurations in which the shielding traces 1102 are designed in any form, including a continuous sheet that covers the entirety of the layer 100, as well as thin traces that follow their underlying traces 104 and offer lesser (yet often satisfactory) protection yet weigh less than a continuous metallic sheet.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed.

Many modifications and variations are possible in view of the above teachings. For example, each circuit layer can be designed with any number of traces extending to each sensing element, which can be a piezoelectric transducer, fiber optic sensor, or any other actuator or sensor. Similarly, the traces can be deposited on one or two layers as required, and an entirely separate layer can be employed to shield the sensing elements and traces, wherein this shielding layer can take on any shape, from traces that mirror their underlying signal and ground traces, to a continuous metallic sheet. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method of fabricating a sensing layer, comprising:
providing a flexible substrate, the flexible substrate having a dielectric layer and conductive leads exposed on the dielectric layer, the conductive leads extending to an edge of the dielectric layer;
providing a first flexible nonconductive cover layer having holes therethrough;
affixing the first cover layer to the flexible substrate so as to overlay the conductive leads, wherein the first cover layer is affixed so as to align the holes with the conductive leads, thereby exposing at least a portion of the conductive leads through the first cover layer;
placing strain sensing elements through the holes in the first cover layer and onto the conductive leads; and
depositing an adhesive within the holes so as to surround the sensing elements with the adhesive.

2. The method of claim 1 wherein the sensing elements each have a ground terminal and a signal generating terminal, and wherein the placing further comprises placing the signal generating terminals onto the conductive leads so as to form a sensing layer configured to receive electrical signals from an array of the sensing elements, thereby facilitating the structural health monitoring of a structure.

3. The method of claim 2 further comprising providing a second flexible nonconductive cover layer, the second cover layer having a dielectric layer and conductive leads extending to the edge of the dielectric layer of the second flexible substrate, and attaching the second cover layer to the first cover layer so as to place the signal generating terminals of the sensing elements in electrical communication with associated ones of the conductive leads of the second cover layer.

4. The method of claim 3 wherein the attaching further comprises perforating the second cover layer in the vicinity of an end of the conductive leads of the second cover layer, so as to form a plurality of tabs at the ends of the conductive leads, and attaching the second cover layer to the first cover layer so as to align the tabs with the holes, wherein the placing further comprises aligning the tabs with associated ones of the signal generating terminals so as to place the sensing elements in electrical communication with associated ones of the conductive leads of the second cover layer, and wherein the depositing further comprises depositing adhesive around the sensing elements so as to affix the tabs to associated ones of the sensing elements.

5. The method of claim 2 further comprising attaching the first cover layer and the ground terminals of the sensing elements to a conductive structure so as to ground the sensing elements, and so as to facilitate the structural health monitoring of the conductive structure.

6. The method of claim 2 wherein at least some of the conductive leads are ground leads and at least some others of the conductive leads are signal leads, wherein each of the holes exposes at least a portion of both a conductive lead and a ground lead, and wherein the placing further comprises placing the ground terminals onto associated ones of the ground leads, and placing the signal generating terminals onto associated ones of the signal leads.

7. The method of claim 2 wherein the placing further comprises placing the signal generating terminals onto more than one of the conductive leads.

8. The method of claim 2 wherein the placing further comprises placing the ground terminals onto more than one of the conductive leads.

9. The method of claim 1 wherein the providing a flexible substrate further comprises providing a flexible substrate having conductive contacts each located proximate to the edge of the dielectric layer and in electrical communication with associated ones of the conductive leads, the contacts configured to be placed in electrical communication with the conductive leads of a further flexible substrate having additional sensing elements.

10. The method of claim 1 further comprising, after the depositing, forming the flexible substrate and first cover layer into a three dimensional shape, and treating the flexible substrate and cover layer so as to induce the maintaining of the three dimensional shape.

11. The method of claim 10 wherein the treating further comprises applying at least approximately 30 psi of pressure to the flexible substrate and first cover layer so as to maintain the three dimensional shape, and heating the flexible substrate and first cover layer to a temperature of at least approximately 250° F.

12. The method of claim 1 further comprising selectively applying an electrically conductive layer proximate to and electrically insulated from at least one of the sensing elements and the conductive leads, the electrically conductive layer selectively placed so as to at least partially shield the sensing elements and the conductive leads from electromagnetic radiation.

13. The method of claim 1 wherein the placing further comprises placing piezoelectric sensing elements configured to transmit and detect propagating stress waves.

14. The method of claim 1 wherein the placing further comprises placing fiber optic sensing elements configured to transmit and detect propagating stress waves.

15. The method of claim 1 wherein the providing a flexible substrate further comprises providing a flexible substrate having electrical impedance elements in electrical communication with the conductive leads, the electrical impedance elements configured to reduce the amplitude of at least some electrical signals transmitted by the conductive leads.

16. A method of manufacturing an embedded sensor layer, comprising:
providing a flexible substrate having conductive traces deposited on a dielectric medium, and holes in the dielectric material exposing portions of the conductive traces, the conductive traces extending to an edge of the flexible substrate and exposed on an outer surface of the dielectric medium;

placing strain sensing elements in the holes and in electrical communication with the exposed portions of the conductive traces;

depositing a nonconductive adhesive within the holes so as to at least partially surround the sensing elements, and so as to affix the sensing elements to the flexible substrate; and attaching the flexible substrate and the sensing elements to a structure so as to facilitate the monitoring of the structural health of the structure by the sensing elements.

17. The method of claim 16 wherein the attaching further comprises embedding the flexible substrate within the structure.

18. The method of claim 16 wherein the sensing elements each have a ground terminal and a signal generating terminal, and wherein the placing further comprises placing the signal generating terminals onto the conductive traces so as to form a sensing layer configured to receive electrical signals from an array of the sensing elements, thereby facilitating the structural health monitoring of a structure.

19. The method of claim 18 further comprising providing a flexible nonconductive cover layer, the cover layer having a dielectric layer and conductive traces extending to the edge of the dielectric layer of the flexible substrate, and attaching the cover layer to the flexible substrate so as to place the signal generating terminals of the sensing elements in electrical communication with associated ones of the conductive traces of the cover layer.

20. The method of claim 19 wherein the attaching further comprises perforating the cover layer in the vicinity of an end of the conductive traces of the cover layer, so as to form a plurality of tabs at the ends of the conductive traces, and attaching the cover layer to the flexible substrate so as to align the tabs with the holes, wherein the placing further comprises aligning the tabs with associated ones of the signal generating terminals so as to place the sensing elements in electrical communication with associated ones of the conductive traces of the cover layer, and wherein the depositing further comprises depositing adhesive around the sensing elements so as to affix the tabs to associated ones of the sensing elements.

21. The method of claim 18 wherein the structure is at least partially electrically conductive, and wherein the attaching further comprises attaching the cover layer and the ground terminals of the sensing elements to the structure so as to ground the sensing elements.

22. The method of claim 18 wherein at least some of the conductive traces are ground traces and at least some others of the conductive traces are signal traces, wherein each of the holes exposes at least a portion of both a conductive trace and a ground trace, and wherein the placing further comprises placing the ground terminals onto associated ones of the ground traces, and placing the signal generating terminals onto associated ones of the signal traces.

23. The method of claim 18 wherein the placing further comprises placing the signal generating terminals onto more than one of the conductive traces.

24. The method of claim 18 wherein the placing further comprises placing the ground terminals onto more than one of the conductive traces.

25. The method of claim 16 wherein the providing a flexible substrate further comprises providing a flexible substrate having conductive contacts each located proximate to the edge of the dielectric layer and in electrical communication with associated ones of the conductive traces, the contacts configured to be placed in electrical communication with the conductive traces of a further flexible substrate having additional sensing elements.

26. The method of claim 16 further comprising, after the depositing, forming the flexible substrate into a three dimensional shape, and treating the flexible substrate so as to induce the maintaining of the three dimensional shape.

27. The method of claim 26 wherein the treating further comprises applying at least approximately 30 psi of pressure to the flexible substrate layer so as to maintain the three dimensional shape, and heating the flexible substrate to a temperature of at least approximately 250° F.

28. The method of claim 16 further comprising selectively applying an electrically conductive layer proximate to and electrically insulated from at least one of the sensing elements and the conductive traces, the electrically conductive layer selectively placed so as to at least partially shield the sensing elements and the conductive traces from electromagnetic radiation.

29. The method of claim 16 wherein the placing further comprises placing piezoelectric sensing elements configured to transmit and detect propagating stress waves.

30. The method of claim 16 wherein the placing further comprises placing fiber optic sensing elements configured to transmit and detect propagating stress waves.

31. The method of claim 16 wherein the providing a flexible substrate further comprises providing a flexible substrate having electrical impedance elements in electrical communication with the conductive traces, the electrical impedance elements configured to reduce the amplitude of at least some electrical signals transmitted by the conductive traces.

32. A method of fabricating a sensing layer, comprising:

providing a flexible substrate, the flexible substrate having a dielectric layer and conductive leads exposed on the dielectric layer, the conductive leads extending to an edge of the dielectric layer;

providing a first flexible nonconductive cover layer having holes therethrough;

affixing the first cover layer to the flexible substrate so as to overlay the conductive leads, wherein the first cover layer is affixed so as to align the holes with the conductive leads, thereby exposing at least a portion of the conductive leads through the first cover layer;

placing sensor/actuators through the holes in the first cover layer and onto the conductive leads; and depositing an adhesive within the holes so as to surround the sensor/actuators with the adhesive.

* * * * *